(12) United States Patent
Sames (10) Patent No.: US 11,602,151 B2
(45) Date of Patent: Mar. 14, 2023

(54) CUTTING EQUIPMENT (71) Applicant: Poly-clip System GmbH & Co. KG, Hattersheim (DE)

(72) Inventor: Jörg Sames, Alten Buseck (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 291 days.

(21) Appl. No.: 16/881,849

(22) Filed: May 22, 2020

(65) Prior Publication Data
US 2020/0367520 A1 Nov. 26, 2020

(30) Foreign Application Priority Data
May 24, 2019 (EP) ..................................... 19176378

(51) Int. Cl.
*A22C 11/12* (2006.01)
*B26D 1/06* (2006.01)
*B26D 5/12* (2006.01)

(52) U.S. Cl.
CPC .............. *A22C 11/125* (2013.01); *B26D 1/06* (2013.01); *B26D 5/12* (2013.01); *B26D 2210/02* (2013.01)

(58) Field of Classification Search
CPC .......... A22C 11/125; B26D 1/06; B26D 5/12; B26D 2210/02
See application file for complete search history.

(56) References Cited

U.S. PATENT DOCUMENTS

| 3,383,754 A | * | 5/1968 | Klenz | ..................... B65B 51/04 29/243.57 |
| 3,543,378 A | * | 12/1970 | Klenz | .................. A22C 11/125 29/243.57 |

(Continued)

FOREIGN PATENT DOCUMENTS

| DE | 202006004688 U1 * | 7/2006 | ............. B26B 7/005 |
| EP | 2353808 A1 | 8/2011 | |

OTHER PUBLICATIONS

QuickExhaustValvesSE/SEU, XP055644065;Nov. 30, 2014,pp. 1-7. (Year: 2014).*

(Continued)

*Primary Examiner* — Jonathan G Riley
(74) *Attorney, Agent, or Firm* — Fitch, Even, Tabin & Flannery LLP (57) ABSTRACT

The present invention relates to a cutting equipment having a cutting device with a cutting element and a drive device for the cutting element. The drive device includes a pneumatically driven piston/cylinder arrangement and a switch valve having a high-pressure input port, a high-pressure output port and a low-pressure output port, with the high-pressure input port coupled to a high-pressure source, the high-pressure output port coupled to a first cylinder chamber and the low-pressure output port coupled to a second cylinder chamber. The switch valve connects the high-pressure input port to the high-pressure output port upon application of a pressurized fluid, and connects the high-pressure output port to the low-pressure output port upon reduction of the pressure level of the pressurized fluid. The present invention further relates to a clipping machine for producing sausage-shaped products, including said cutting equipment, and a method for controlling the cutting equipment.

15 Claims, 6 Drawing Sheets

(56) References Cited

U.S. PATENT DOCUMENTS

| | | | | |
|---|---|---|---|---|
| 4,044,426 | A | * | 8/1977 | Kupcikevicius ... A22C 11/0245 452/45 |
| 4,214,492 | A | * | 7/1980 | Hoffman .............. A22C 11/125 452/49 |
| RE30,390 | E | * | 9/1980 | Kupcikevicius ..... A22C 11/125 452/45 |
| 6,658,972 | B1 | | 12/2003 | Burke |
| 8,771,044 | B2 | * | 7/2014 | Sarnes .................... B26D 5/12 452/48 |
| 2007/0214861 | A1 | | 9/2007 | Lefavour et al. |

OTHER PUBLICATIONS

EPO; Application No. 19176378.8; Extended European Search Report dated Dec. 9, 2019.
"Quick Exhaust Valves SE/SEU," XP055644065; Nov. 30, 2014, pp. 1-7.
"How Does a Quick Exhaust Valve Work?", XP055644124; Clippard Knowledgebase, Nov. 19, 2019.

* cited by examiner

CUTTING EQUIPMENT

CROSS-REFERENCE TO RELATED APPLICATION

The present application claims the benefit of priority of European Patent Application No. 19176378.8 filed on May 24, 2019, the contents of which are incorporated herein by reference in their entirety.

FIELD OF THE INVENTION

The present invention relates to a cutting equipment having a cutting device with a cutting element which is linearly reversibly movable in a cutting direction, and a drive device for reversibly moving the cutting device, wherein the drive device includes a pneumatically driven piston/cylinder arrangement comprising a cylinder and a piston. The present invention further relates to a clipping machine for producing sausage-shaped products by filing a flowable filling material into a tubular or bag-shaped packaging casing and closing said packaging casing by a closure means, like a closure clip, wherein the clipping machine includes the inventive cutting equipment for separating a sausage-shaped product just produced from the remaining supply of tubular or bag-shaped packaging casing, and a method for controlling the inventive cutting equipment.

BACKGROUND OF THE INVENTION

In practice, it is known that, for example in the production of sausage-shaped products, like sausages, filling material is fed into a tubular or bag-shaped packaging casing which is stored on a filling tube, and which is closed at its front end by a closure means, like a closure clip, i.e. the end of the packaging casing pointing in the feeding direction of the filling material. After a predetermined portion of filling material has been fed into the tubular or bag-shaped packaging casing, the filled tubular or bag-shaped packaging casing is gathered by gathering means, and a plait-like portion being at least substantially free from filling material is formed thereto, and a first closure clip is placed and closed on said plait-like portion for closing the portion of the tubular or bag-shaped packaging casing just filled.

Additionally, a second closure clip may be placed for closing the front end of the sausage-shaped product to be produced next. For severing the sausage-shaped product just produced from the remaining supply a tubular or bag-shaped packaging casing, a cutting device may be provided for cutting off the casing material between the first and second closure clip.

From U.S. Pat. No. 7,536,838, a device for producing food products by applying clips to packages is known. The device includes a clipper for applying two closure clips to a casing, one for closing the just filled casing portion and one for closing the subsequent casing portion to be filled next. An automatically actuated knife including a double-acting piston/cylinder drive with a cutting element attached to the piston rod, severs the packaging between these two closure clips. The knife is attached to one of the clipper gates for wrapping the filled packaging, and which carries one of the closing tools for closing the closure clips.

A further packaging apparatus which includes a clipper for applying clips to packaging material, like netting, is known from U.S. Pat. No. 7,478,515. The clipper has a gate mechanism for wrapping the netting material, a clipping mechanism, to place and close two clips at the wrapped netting material, and a cutting cartridge for severing the netting material between the two clips. The cutting cartridge includes a double-acting piston/cylinder arrangement as an actuator, with an actuator rod and a stabilizer block attached to one end of the actuator rod, and with the stabilizer block carrying the knife.

These known devices enable the production of sausage-shaped products by forming a plait-like portion to the filled casing portion, to apply two closure clips thereto, and to sever the sausage-shaped product just produced from the remaining supply of casing material. However, particularly with regard to the cutting devices, it has to be noted that these devices are of complicate construction which requires an increased maintenance and cleaning effort, and which have a high consumption of pressurized air.

Thus, it is an object of the present invention to overcome the above-mentioned drawbacks, and to provide a cutting equipment which is of a simpler design, that enables a reduced fluid consumption and a reduced maintenance and cleaning effort.

SUMMARY OF THE INVENTION

According to the present invention, there is provided a cutting equipment having a cutting device with a cutting element which is linearly reversibly movable in a cutting direction, and a drive device for reversibly moving the cutting element, wherein the drive device includes a pneumatically driven piston/cylinder arrangement. The piston/cylinder arrangement comprises a cylinder and a piston. The piston has a first effective piston surface and a second effective piston surface. The cutting device is connected with the second effective piston surface and the first effective piston surface facing away from the cutting device. The piston is linearly reversibly movable in the cylinder between a retracted position and an extended position, the cylinder has a first end and a second end, and is separated by the piston into a first cylinder chamber arranged between the first effective piston surface and the first end of the cylinder, and a second cylinder chamber arranged between the second effective piston surface and the second end of the cylinder. The cutting equipment further comprises a switch valve having a high-pressure input port, a high-pressure output port and a low-pressure output port, with the high-pressure input port coupled to a high-pressure source, the high-pressure output port coupled to the first cylinder chamber and the low-pressure output port coupled to the second cylinder chamber. The switch valve is adapted to connect the high-pressure input port to the high-pressure output port upon application of a pressurized fluid, and to connect the high-pressure output port to the low-pressure output port upon reduction of the pressure level of the pressurized fluid.

This specific design enables a simpler construction of the cutting equipment. Moreover, by guiding the pressurized fluid necessary for the cutting operation in the first cylinder chamber, into the second cylinder chamber for moving the piston into its retracted or standby position after the cutting operation has been completed, the fluid consumption of the cutting equipment may be reduced. The reduction may amount up to about 50%.

In a preferred design of the inventive cutting equipment, the drive device has a housing which forms the cylinder. Additionally, a closure cap may be provided at the first end of the cylinder. These features enable a simplified and inexpensive production of the cutting equipment.

In a further preferred embodiment, a high-pressure connector port is arranged in the closure cap for connecting the first cylinder chamber to the high-pressure output port of the switch valve, whereby a safe connection of the cylinder chamber to the pressure source is enabled.

A connection between the second cylinder chamber with the low-pressure output port of the switch valve may be realized in various ways, e.g. in the region of the second end of the cylinder. In order to realize a compact design of the inventive cutting equipment, a low-pressure connector port is arranged in the housing for connecting the second cylinder chamber to the low-pressure output port of the switch valve. The low-pressure connector port may be arranged in a distance as far as possible from the second end of the cylinder, or the front end of the housing respectively, to enable a proper positioning of the cutting equipment with the cutting element in close vicinity to the closing tools.

In an advantage embodiment of the inventive cutting equipment, a bore is provided in the housing extending from the first end of the cylinder towards its second end in cutting direction, and which opens into the second cylinder chamber, with the low-pressure connector port being in fluid connection with the bore. This allows to position the low-pressure connector more close to the first end of the cylinder, or the rear end of the housing respectively, whereby a further compact design may be realized, and the mounting or demounting of the cutting equipment is facilitated.

The movement of the piston in a direction contrary to the cutting direction or the reversal movement from the extended or cutting position to the retracted or standby position, particularly after the cutting step, may be realized by the fluid guided from the first cylinder chamber into the second cylinder chamber. However, it is further of advantage, that an elastic element is provided in the second cylinder chamber, for moving the piston in a direction contrary to the cutting direction. The elastic element may support the reversal movement of the piston, or may be the main source for said reversal movement which may then be supported by the pressurized fluid guided from the first cylinder chamber into the second cylinder chamber. In both cases, a safe movement of the piston in the direction contrary to the cutting direction, and thus, the movement of the cutting element into its retracted position, is secured.

The elastic element may be of any suitable material, like rubber or steel, and may be embodied in any suitable design, like a rubber block or a coiled spring. Advantageously, a coiled spring is used, which is a standard element with known features.

In order to execute a precise cutting operation, a guide assembly is provided in the region of the second end of the cylinder, for guiding the cutting element during its reversal movement in the cutting direction. The guide assembly ensures the linear movement of the cutting element and may prevent lateral movement of the cutting element.

In order to further enhance the reliability of the cutting equipment as well as the result of the cutting operation, the guide assembly may include at least one support element, for supporting the cutting element during its reversal movement. Said at least one support element is arranged such that forces exerted to the cutting element during the cutting operation, e.g. in a direction vertically to the cutting direction, are supported by said support element.

In a preferred embodiment of the inventive cutting equipment, the cutting element is directly connected with the second effective piston surface. The cutting element is thereby directly moved by the piston, and e.g. a piston rod or bearing elements, as additional intermediate elements may be omitted. This allows a further compact design with a reduced overall length and reduced overall weight of the cutting equipment.

In an advantage constitution, the switch valve is a quick exhaust valve, with which the control amount may be reduced, particularly, in the case that the quick exhaust valve is an automatically working valve. Such an automatically working quick exhaust valve automatically establishes a connection between the high-pressure input port and the high-pressure output port upon application of a pressurized fluid pulse to the high-pressure input port, and further automatically establishes a connection between the high-pressure output port and the low-pressure output port upon a reduction of the pressure level.

According to the resent invention, there is further provided a clipping machine for producing sausage-shaped products, like sausages, by filing a flowable filling material into a tubular or bag-shaped packaging casing and closing said packaging casing by a closure means, like a closure clip. The clipping machine comprises a filling tube for feeding the filling material in a feeding direction into the tubular or bag-shaped packaging casing stored on the filling tube and being closed at its front end, gathering means for gathering the filled packaging casing and for forming a plait-like portion thereto, wherein the gathering means include a first displacer unit and a second displacer unit, and wherein the second displacer unit is reversibly movable in the feeding direction for forming a filling material free plait-like portion at the gathered portion of the filled packaging casing, and a clipping device having at least a first and a second closing tool being reversibly movable between an opened position and a closed position, for applying at least one closure means to the plait-like portion and closing said closure means when the closing tools are in their closed position. The clipping machine further comprises the inventive cutting equipment, for separating a sausage-shaped product just produced from the remaining supply of tubular casing material.

Further according to the present invention, there is provided a method for controlling the inventive cutting equipment, wherein the cutting arrangement includes a cutting device which is linearly reversibly movable in a cutting direction, and a drive device for reversibly moving the cutting device, with the drive device including a piston/cylinder arrangement. The method comprises the steps of providing a pressurized fluid applied to a high-pressure input port of a switch valve being in a first operating state, via a high-pressure output port of the switch valve to a first chamber of the cylinder, thereby moving the piston from a retracted position into an extended position, after the piston has reached the extended position, reducing the pressure level of the pressurized fluid provided to the high-pressure input port of the switch valve, and guiding the pressurized fluid from the first chamber of the cylinder via the high-pressure output port of the switch valve being in a second operating state, and a low-pressure output port of the switch valve to a second chamber of the cylinder, thereby moving the piston from the extended position into the retracted position. The switch valve is automatically transferred into the first operating state upon provision of the pressurized fluid to its high-pressure input port. Furthermore, in the inventive method, the switch valve is automatically transferred from the first operating state into the second operating state upon reduction of the pressure level of the pressurized fluid.

The inventive clipping machine as well as the inventive method thereby provide all advantages as explained in conjunction with the inventive cutting equipment.

Further advantages and preferred embodiments of the present invention will be described in the following together with the drawings listed below. The expressions "left", "right", "below" and "above" used in the following description, are referred to the drawings in an alignment such that the reference numbers and the notation of the figures used can be read in normal orientation.

DETAILED DESCRIPTION

Figure 1:
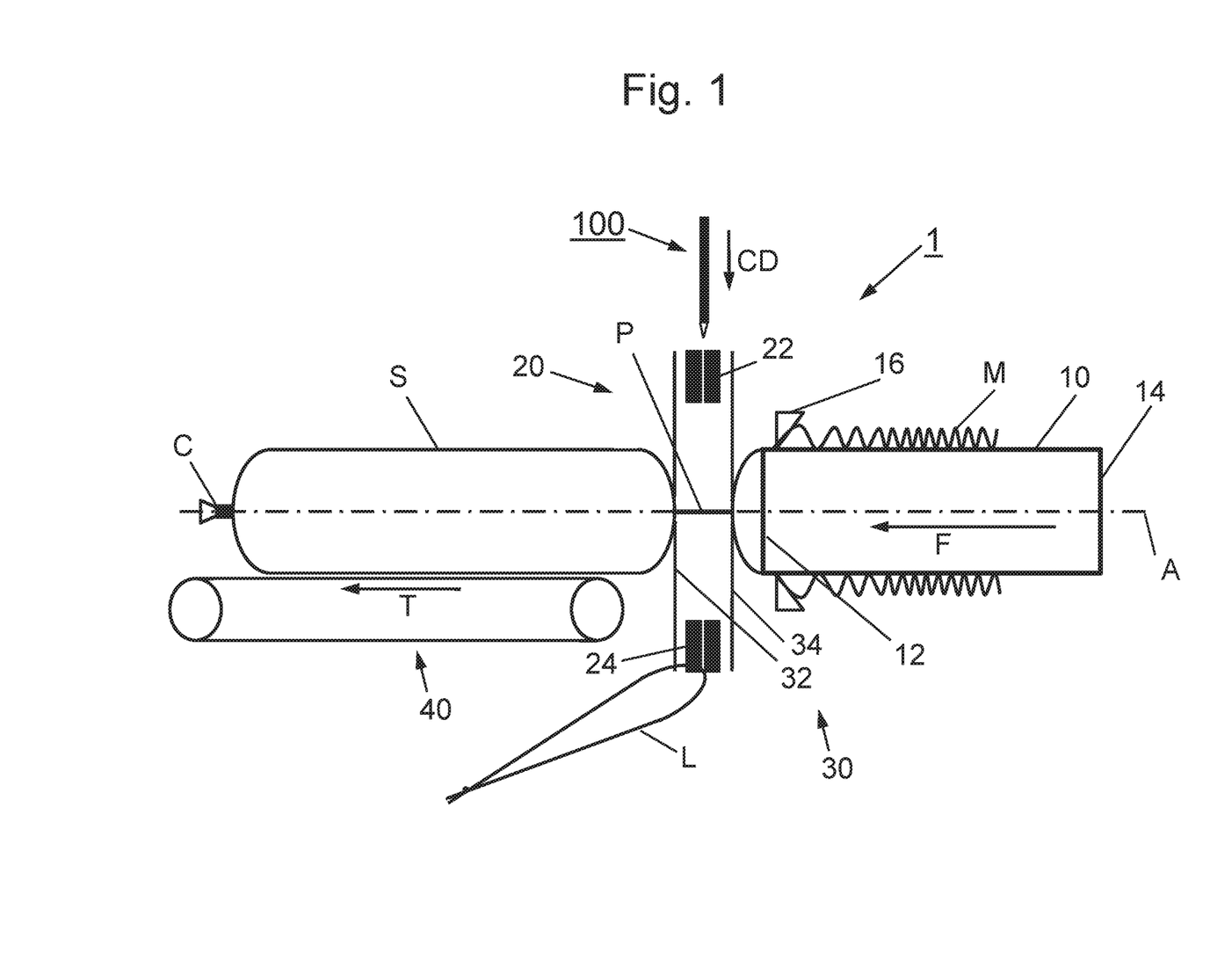
FIG. 1: is a schematic view showing the principal design of a clipping machine for producing sausage-shaped products.

A clipping machine 1 for producing sausage-shaped products S, like sausages, which contain a flowable filling material in a tubular or bag-shaped packaging casing M, is shown schematically in FIG. 1, in particular its closing region. Clipping machine 1 comprises filling tube 10 having a longitudinally and horizontally extending central axis A, with a discharge opening for discharging the filling material at its left end 12 and a feeding opening for feeding the filling material into filling tube 10 in a feeding direction F to the discharge opening of filling tube 10, for example by a feeding pump (not shown), at its right end 14. Moreover, a casing brake assembly 16 is arranged on and coaxially with filling tube 10 in the region of the left end 12 of filling tube 10. Filling tube 10 is made of a suitable material, like stainless steel.

A supply of tubular packaging casing M made of a thin sheet material is stored on filling tube 10 in a folded manner like a concertina. From the supply of tubular packaging casing M, tubular packaging casing M is pulled-off during the process of producing the sausage-shaped products S, in particular by the feeding pressure for filling the filling material into tubular packaging casing M wherein casing brake assembly 16 provides a braking force for allowing a controlled pulling-off of tubular packaging casing M during the filling process.

Clipping machine 1 further comprises a clipping device 20 for closing a filled tubular packaging casing M by applying closure means, like closure clips or closing clips C, to a plait-like portion P, and gathering means 30 for gathering the filled tubular packaging casing M and forming said plait-like portion P thereto. These components are all arranged downstream filling tube 10.

As can be inferred from FIG. 1, clipping device 20 is positioned immediately downstream left end 12 of filling tube 10, and coaxially aligned to filling tube 10.

Clipping device 20 comprises a first and a second clipping tool 22, 24 formed by a punch 22 and a die 24. It has to be noted that punch 22 and die 24 may apply and close a single closure clip C for closing just filled tubular packaging casing M, or may apply and close two closure clips C at the same time, a first closure clip C for closing the rear end of just filled tubular packaging casing M for forming a sausage-shaped product S, and a second closure clip C for closing the front end of a tubular packaging casing M subsequently to be filled.

Gathering means 30 include a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P. First displacer unit 32 can reversibly be moved parallel to feeding direction F of the filling material.

If it is intended to store sausage-shaped products S on a rod-like element, like a smoking rod, e.g. for further processing like cooking or smoking, a suspension element L, like a suspension loop, may be provided and attached to one end of each of sausage-shaped products S, or at one end of a chain of sausage-shaped products. Suspension element L may be fed to one of closing tools 22, 24, and may be fixed to the respective end of sausage-shaped product S by means of closure clip C which closes said end of sausage-shaped product S.

For discharging a sausage-shaped product S just produced from clipping machine 1 in a transportation direction T being at least substantially the same as feeding direction F, a discharge device 40 is arranged downstream clipping device 20, which may be a belt conveyor comprising a conveyor belt and guide rollers. In a simple case, discharge device 40 may be a chute.

For storing sausage-shaped products S on a rod-like element, suspension element L is caught by a catching device (not shown), like a catching needle, which guides suspension element L towards the rod-like element.

For separating sausage-shaped product S just produced from the remaining supply of tubular packaging casing M stored on filling tube 10, an inventive cutting equipment 100, which is in FIG. 1 only schematically shown, may be provided, and an embodiment of which is disclosed in detail below. Said cutting equipment 100 cuts the tubular packaging casing M upstream closure clip C which closes the just filled portion of tubular packaging casing M. In case that two closure clips C have been applied to plait-like portion P by clipping device 20, cutting equipment 100 cuts plait-like portion P between said two closure clips C.

In general, cutting equipment 100 includes a cutting element 142 which is reversibly moved in a cutting direction CD aligned at least approximately vertically to the longitudinal axis of plait-like portion P, which usually coincides with or which is aligned at least approximately parallel to central axis A of filling tube 10.

Cutting equipment 100 according to the inventive embodiment shown in FIGS. 2 to 5 has a housing 110 with a front end 111, a rear end 112, a top side 113, a bottom side 114, a left side 115 and a right side 116 both referred to front end 111. Housing 110 has an approximately cuboid shape with top and bottom sides 113, 114 and left and right sides 115, 116, respectively, being parallel to each other, and with rear side 112 extending vertically thereto. Front side 111 has only a short vertical portion. In its lower region, a protrusion 130 extending in cutting direction CD is arranged as an extension of bottom side 114.

Figure 2:
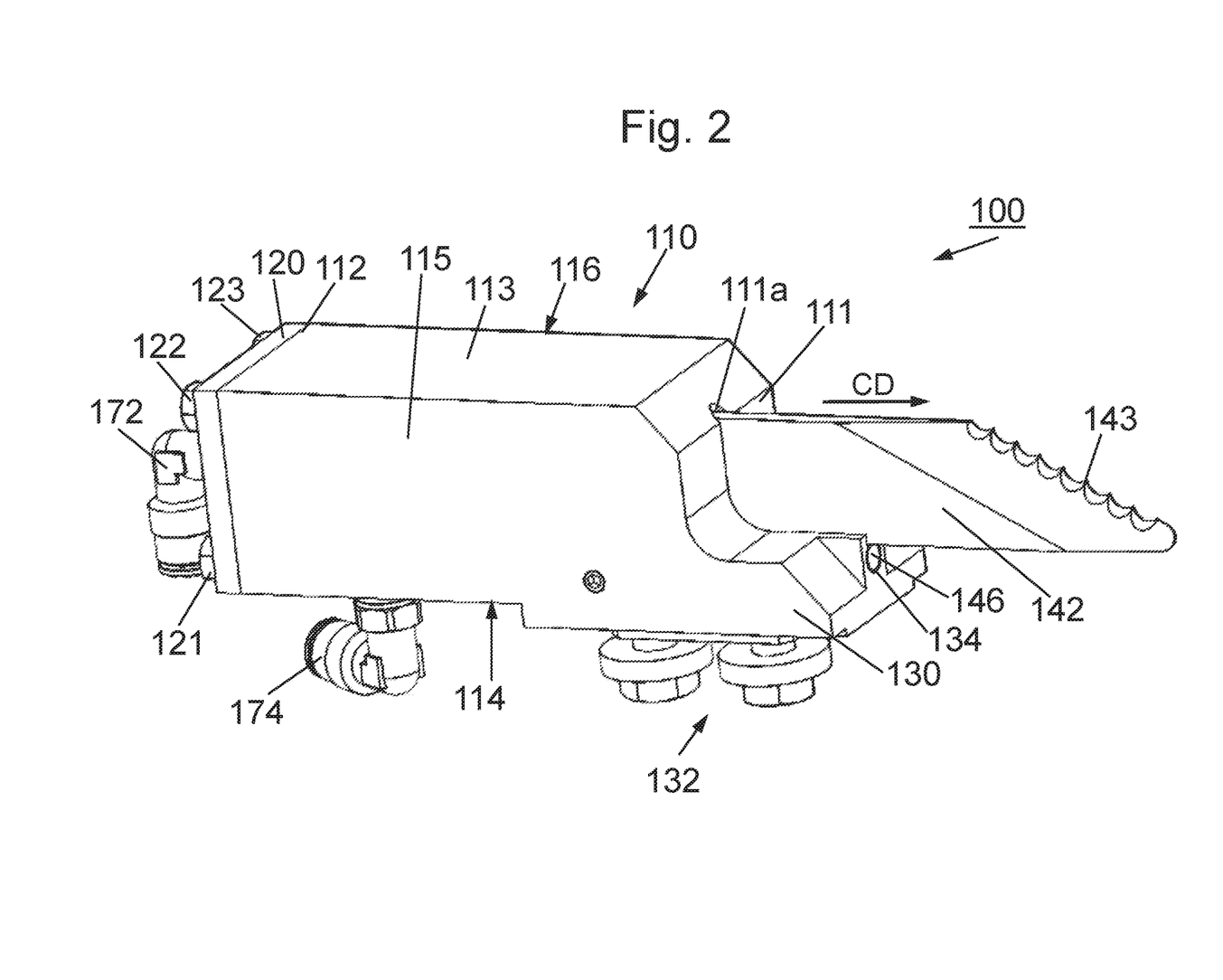
FIG. 2: is a perspective view to the front side of an embodiment of the cutting equipment according to the present invention.
Figure 3:
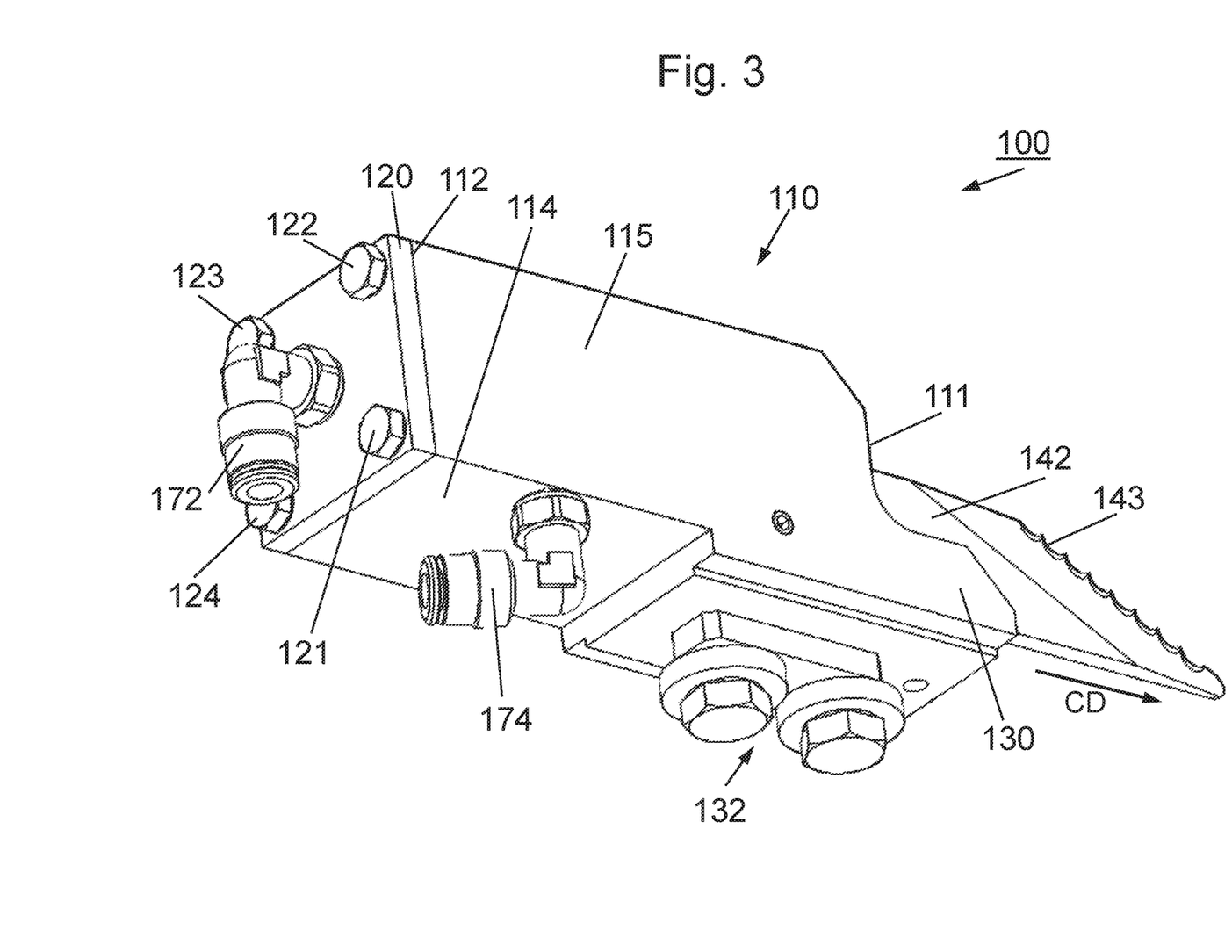
FIG. 3: is a perspective view to rear side of the cutting equipment according to FIG. 2.

At the underside of protrusion 130, an attachment arrangement 132 is provided, for attaching cutting equipment 100 to an apparatus, like a clipping machine. Attachment arrangement 132 extends over protrusion 130 and a part of underside 114 of housing 110. As can be seen in FIGS. 2 and 3, attachment arrangement 132 may include guide elements, like tongues, and fixing elements, like screws (cf. FIG. 3).

A closure cap 120 in the form of a rectangular plate is arranged at rear end 112 of housing 110, and fixed thereto by four screws 121, 122, 123, 124. Screws 121, 122, 123, 124 extend through closure cap or plate 120 in the region of its corners in cutting direction CD into respective holes in housing 110.

A cutting element 142 of a cutting device 140 protrudes from front side 111 of housing 110 in cutting direction CD and can reversibly be moved from a standby position shown FIGS. 2 and 3 to a cutting position. Cutting element 142 has the shape of an upright plate with a cutting edge 143 at its end facing in cutting direction CD. Cutting element 142 extends out of housing 110 through a vertical slot 111a in front side 111 of housing 110 in the standby position.

Figure 4:
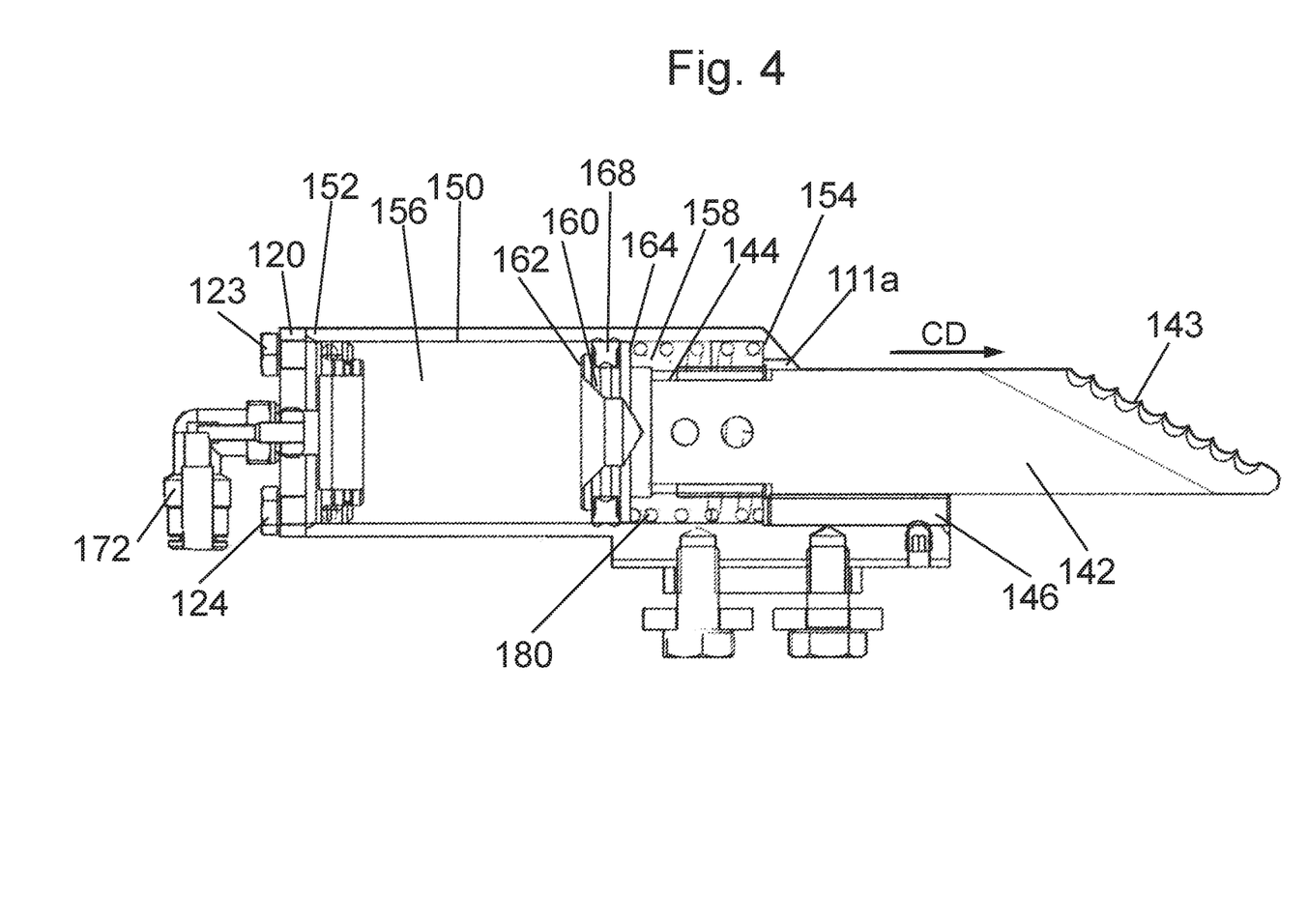
FIG. 4: is a sectional view to the cutting equipment of FIG. 1, in a vertical plane extending centrally trough the cutting equipment and in the cutting direction.

FIG. 4 is a sectional view to the cutting equipment 100, in a vertical plane extending centrally trough cutting element 142 of cutting equipment 100 and in the cutting direction CD. As can be seen in FIG. 4, a cylindrical bore 150 is arranged in housing 110, which extends from rear end 112 of housing 110 to front end 111 in cutting direction CD. At its first end 152, cylindrical bore or cylinder 150 is fluid tightly closed by closure cap or plate 120 which has a corresponding cylindrical protrusion extending into cylinder 150, and a respective sealing element arranged between said protrusion and cylinder 150. Cylinder 150 which is embodied as a blind hole, terminates with its second end 154 at front side 111 of housing 110.

A piston 160 which has the principal shape of a cylindrical plate, is arranged in cylinder 150, and reversibly movable in cylinder 150 in cutting direction CD from the standby position into the cutting position. Piston 160 has a first active piston surface 162 facing towards first end 152 of cylinder 150, and a second active piston surface 164 facing towards second end 154 of cylinder 150. Accordingly, a first cylinder chamber 156 is formed between piston 160 and first end 152 of cylinder 150, and a second cylinder chamber 158 is formed between piston 160 and second end 154 of cylinder 150. For fluid tightly separating first and second cylinder chambers 156, 158, piston 160 is provided with at least one sealing element 168, like a sealing ring, extending along its circumferential surface. Piston 160 is reversibly movable within cylinder 150 between a retracted or standby position (not shown) in which piston 160 is positioned close to first end 152 of cylinder 150, and an extended or cutting position in which piston 160 is close to second end 154 of cylinder 150. Cylinder 150 with plate 120 and piston 160 form the drive device of cutting equipment 100, in particular cutting element 142.

Cutting element 142 of cutting device 140 is fixed to piston 160 by a fixing arrangement which includes a carrier element 144 to which cutting element 142 is fixed with its end facing towards piston 160 by respective fixing elements, like screws. Carrier element 144 is fixed to second effective surface 164 of piston 160.

Carrier element 144 may be a separate element, or may integrally formed with piston 160. Cutting element 142, carrier element 144 and the fixing elements for fixing cutting element 142 to carrier element 144 form cutting device 140.

Cutting element 142 is supported at its lower side by a support element 146. Support element 146 according to the embodiment of FIGS. 2 to 5, has an approximately circular cross-section and a longitudinal extension. Support element 146 is placed in a respective recess 134 in protrusion 130, such that cutting element 142 is guided by slot 111a and recess 134 which form a guide assembly, and may slide along the upper side of support element 146 during its reversal movement in cutting direction CD. Support element 144 absorbs forces in vertical direction and parallel to the side surfaces of cutting element 142 which act on cutting element 142 during the cutting operation. Cutting element 142 is made of a suitable material, like plastic, in order to reduce friction between cutting element 142 and support element 144.

Slot 111a, through which cutting element 142 extends out of housing 110, establishes a fluid connection between second cylinder chamber 156 and the atmosphere. However, the pressure of the fluid guided into second cylinder chamber 156 is sufficient for securely move piston 160 together with cutting element 142 into its retracted or standby position.

Figure 5:
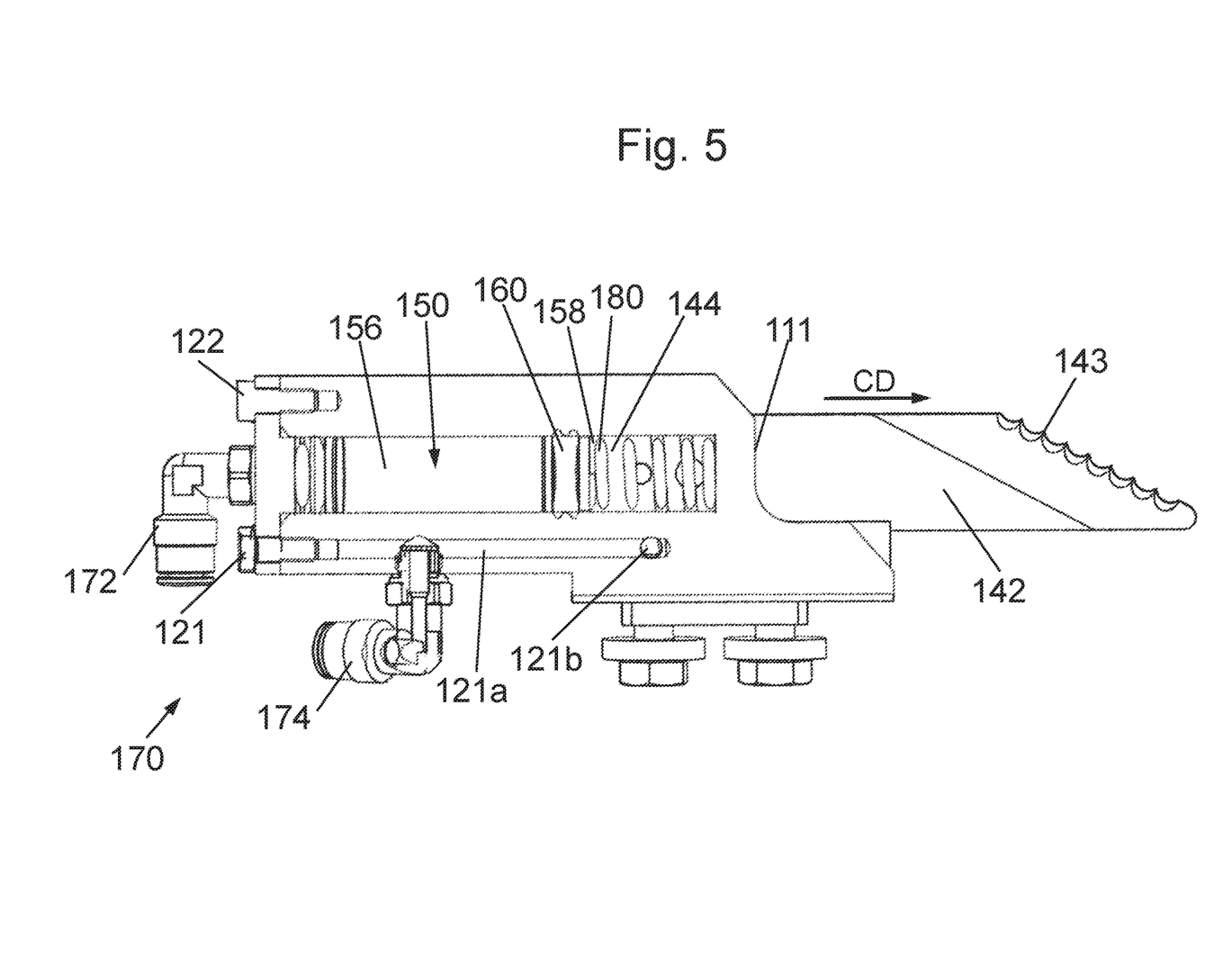
FIG. 5: is a sectional view to the cutting equipment of FIG. 1, in a vertical plane parallel to the central plane of the cutting equipment and through an edge region of the housing.

As can be seen in FIGS. 4 and 5, an elastic element 180 in the form of a coiled spring is arranged in second cylinder chamber 158. Elastic element or spring 180 supports the movement of piston 160 into its retracted or standby position.

In the embodiment of cutting equipment 100 shown in FIGS. 4 and 5, piston 160, and thus, cutting element 142, are in the extended or cutting position. In the cutting position, carrier element 144, which is fixed to second effective surface 164 of piston 160 by its left end, abuts the inside of front end 111 of housing 110 by its right end.

Alternatively, spring 180, when in its fully compressed state, may provide an end stop for piston 160 when moved into its extended or cutting position. Further alternatively, or additionally, an end stop for piston 160 may be formed by a respective abutment element, like a circumferential flange in cylinder 150.

A connector arrangement 170 is provided for connecting cutting equipment 100 to a pressure source, and for operating cutting equipment 100. Connector arrangement 170 includes a high-pressure connector port 172 arranged at closure cap or plate 120, for providing pressurized fluid to first cylinder chamber 156, a low-pressure connector port 174 arranged at underside 115 of housing 110, for providing pressurized fluid to second cylinder chamber 156, and a switch valve 176 for controlling the flow of pressurized fluid to and from cutting equipment 100.

FIG. 5 is a sectional view to cutting equipment 100, in a vertical plane parallel to left and right sides 115, 116 of the housing 110, and which extends through screws 121, 122. As particularly can be seen in FIG. 5, low-pressure connector port 174 is mounted to housing 110 in the region of first cylinder chamber 156, for providing additional space in the region of front side 111, to enable cutting equipment 100 to be proper placed in close vicinity to clipping device 20 of clipping machine 1, and for a proper placement of attachment arrangement 132.

In order to establish a fluid connection between low-pressure connector port 174 and second cylinder chamber 156, the bore into which screw 121 extends for fixing plate 120 to housing 110, is lengthened in cutting direction CD, such that it terminates in the region of second cylinder chamber 156 for forming a fluid channel 121a. A second bore 121b extends through housing 110 at the end of fluid channel 121a and vertically thereto, to provide a fluid connection between fluid channel 121a and second cylinder chamber 156. Second bore 121b is sealed at left side 115 of housing 110 by a respective sealing element, like a screw (cf. FIGS. 2 and 3). Low-pressure connector port 174 is arranged at underside 114 of housing 110 such, that it is in fluid connection with fluid channel 121a.

Figure 6A:
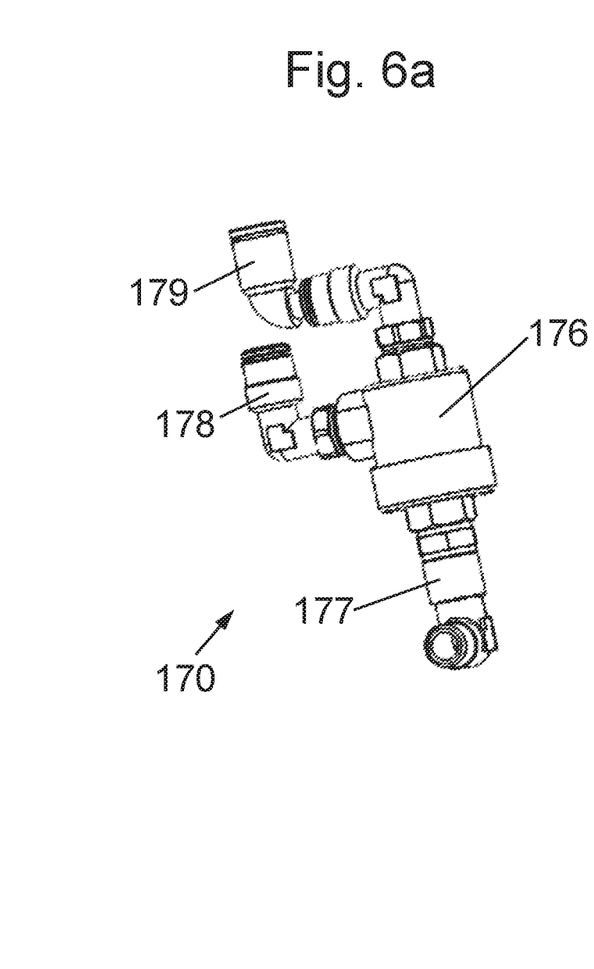
FIG. 6a: is a perspective view to the switch valve.
Figure 6B:
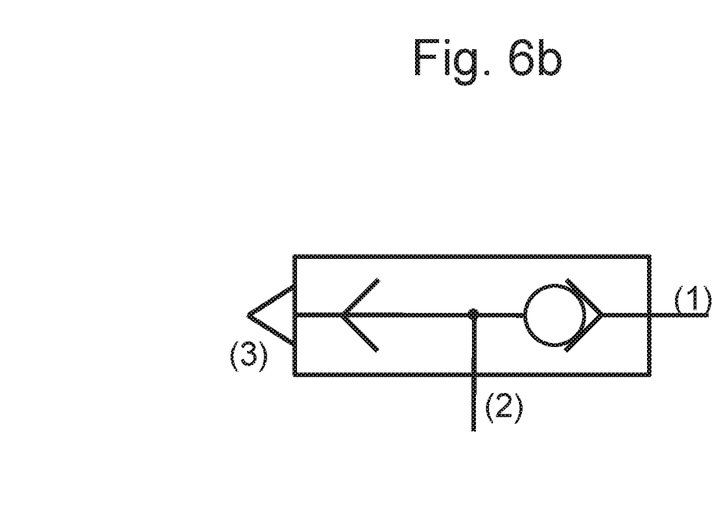
FIG. 6b: is the functional pneumatic circuit diagram of the switch valve embodied as a quick exhaust valve.

As can be seen in FIG. 6a, switch valve 176 has a high-pressure input port 177, a high-pressure output port 178 and a low-pressure output port 179. In the embodiment of FIG. 6a, switch valve 176 is a quick exhaust valve, a functional pneumatic circuit diagram of which is shown in FIG. 6b. In the functional pneumatic circuit diagram of switch valve 176, input port (1) corresponds to high-pressure input port 177, output port (2) corresponds to high-pressure output port 178, and the exhaust port (3) forms low-pressure output port 179.

A quick exhaust valve, like switch valve 176 of FIG. 6a, may be embodied as a check valve including a spring-loaded ball. As particularly can be seen in FIG. 6b, showing the functional pneumatic circuit diagram of a quick exhaust valve, high-pressure input port (1) is closed by a respective element, like a spring-loaded ball. In the following, this state will be referred as a second operating state.

In the seconds state, high-pressure input port (1), or high-pressure input port 177 of switch valve 176 of FIG. 6a respectively, is not connected to a high-pressure source. Accordingly, the ball, actuated by a not shown spring, is pushed rightwards, for closing high-pressure input port (1).

After high-pressure input port (1) is connected to a high-pressure source, a pressurized fluid having a predetermined pressure level, acts on the ball and pushes said ball leftwards against the force of the spring until the ball closes exhaust port (3), or low-pressure output port 179 switch valve 176 respectively.

Thereby, a fluid connection between high-pressure input port (1) and high-pressure output port (2), or high-pressure output port 178 of switch valve 176 respectively, is established. This state of the quick exhaust valve, or switch valve 176 respectively, will be referred as a first operating state.

For switching the quick exhaust valve from its first operating state into second operating state, high-pressure input port (1) is separated from the high-pressure source. Thereafter, the pressure level in the quick exhaust valve decreases. At a predetermined reduced pressure level, the quick exhaust valve or switch valve 176 respectively, switches from second operating state into first operating state, whereby high-pressure input port (1) is closed, and a fluid connection between high-pressure output port (2) and low-pressure output port (3) is established, such that the pressurized fluid may flow from high-pressure output port (2) to low-pressure output port (3). The predetermined reduced pressure level may have a fixe value, e.g. in a case in which the high-pressure value is 6 bar, the reduced pressure level may have a pressure level of 5 bar. Alternatively, the predetermined reduced pressure level may be reduced about a predetermined percentage of the high-pressure value.

For operating cutting equipment 100, high-pressure connector port 172 is connected to high-pressure output port 178 of switch valve 176, and low-pressure connector port 174 is connected to low-pressure output port 179 of switch valve 176. High-pressure input port 177 of switch valve 176 is connected to a high-pressure source.

For producing a sausage-shaped product S on clipping machine 1, tubular casing material M stored on filling tube 10 and closed at its front end by a closure clip C, is filled with filling material which is fed through filling tube 10 into tubular casing M in feeding direction F. After a predetermined portion of filling material is fed into tubular casing M, upper and lower displacer elements of first and second displacer units 32, 34 are moved from their opened position into their closed position for forming a gathered portion to the filled tubular casing M. Thereafter, first displacer unit 32 carries out a linear movement in a horizontal direction and coaxially to feeding direction F. Thereby, a plait-like portion P is formed to the gathered portion of tubular casing material M, and two closure clips C are applied to plait-like portion P and closed by clipping device 20, a first closure clip C for closing the just filled tubular casing M for forming a sausage-shaped product S and a second closure clip C for closing the front end of sausage-shaped product S subsequently to be produced. A suspension element L may be provided and attached to one end of sausage-shaped product S by means of one of the closure clips C.

For severing the just produced sausage-shaped product S from the remaining supply of tubular packaging casing M, cutting equipment 100 is activated, such that plait-like portion P is cut between the two closure clips C, and the sausage-shaped product S just produced may be discharged from clipping machine 1 by discharge device 40.

During the filling and closing process, piston 160 of cutting equipment 100 is in its retracted or standby position, and thus, also cutting element 142 is in a retracted or standby position.

Immediately after the two closure clips C, which close the just filled portion of tubular packaging casing M and the front end of next tubular packaging casing M to be filled next, have been placed at plait-like portion P, cutting equipment 100 is activated by providing pressurized fluid, usually pressurized air, with a predefined pressure level to high-pressure input port 177 of switch valve 176. Switch valve 176 which is thereby brought into a first operating state, establishes a connection between high-pressure input port 177 and high-pressure output port 178. Via high-pressure output port 178 and high-pressure connector 172, the pressurized fluid enters first cylinder chamber 156 and pushes piston 160 in cutting direction CD from its retracted or standby position close to first end 152 of cylinder 150 into its extended or cutting position close to second end 154 of cylinder 150. Thereby, cutting element 142 is moved together with piston 160 in cutting direction CD towards plait-like portion P and cuts with cutting edge 143 gathered casing material M between the two closure clips C.

In the moment when piston 160 has reached its extended or cutting position, the cutting operation is terminated, and the supply of pressurized fluid is interrupted. Switch valve 176, now in the second operating state (cf. FIG. 6b), connects high-pressure output port 178 to low-pressure output port 179, such that the pressurized fluid present in first cylinder chamber 156, is guided via low-pressure output port 179, low-pressure connector 174, fluid channel 121a and second bore 121b to second cylinder chamber 156, for moving piston 160 from its extended position into its retracted position.

According to FIGS. 4 and 5, spring 180 is arranged in second cylinder chamber 156. Spring 180 supports the movement of piston 160 towards its retracted or standby position. Spring 180 further ensures that piston 160, after being moved into its retracted position, remains there, or at least in a position close to the retracted position and with a predefined distance to second end 154 of cylinder 150, which corresponds to the length of spring 180 in its expanded state.

Switch valve 176 according to FIGS. 6a and 6b is a quick exhaust valve, in which, upon detection of a decreasing pressure level, high-pressure output port 178 is automatically connected to the exhaust port or low-pressure output port 179. Usually, the pressure value for activating a cutting equipment is 6 bar. After interrupting the supply of pressurized fluid, the pressure level in first cylinder chamber 156 decreases. At a decreased pressure level, which in practice is about 5 bar, valve 176 automatically switches such that the pressurized fluid in the first cylinder chamber 156 is transferred into second cylinder chamber 156.

As described above, second cylinder chamber 156 has a fluid connection with the atmosphere via slot 111a through which cutting element 142 extends out of housing 110.

The pressure level of the pressurized fluid guided from first cylinder chamber 156 to second cylinder chamber 158 is sufficient to push piston 160 from its extended position into its retracted position. Furthermore, the pressurized fluid may fully expand to the atmosphere through slot 111a in front side 111 of housing 110. Thereby, any debris or wear present in second cylinder chamber 156 may be blown out of second cylinder chamber 156. Additionally, due to the expanding fluid leaving second cylinder chamber 156 through slot 111a, dust and wear or any other particles are prevented from entering second cylinder chamber 156. Thereby cleaning and maintenance of cutting equipment 100 is enhanced.

During the cutting operation, a force, or at least a component thereof, acts via cutting edge 143 onto cutting element 142 in a direction vertically to cutting direction CD and parallel to the surface of cutting element 142. This force is absorbed by support element 146 and protrusion 130. Support element 146 further reduces friction and wear during the reversal movement of cutting element 142.

As mentioned above, switch valve 176, according to the embodiment of FIGS. 6a and 6b is realized as an automatically acting quick exhaust valve in which the exhaust port is connected to second cylinder chamber 158 of cylinder 150. Naturally, it is also possible to provide cutting equipment 100 with a valve which switches in response to a signal provided e.g. by the control unit of clipping machine 1.

In cutting equipment 100 according to the embodiment of FIGS. 4 and 5, a spring 180 is shown for supporting the movement of piston 160 into its retracted position. However, as mentioned above, the pressure level of the pressurized fluid guided into second cylinder chamber 158 is sufficient for executing this movement of piston 160. Spring 180 not necessarily needs to be present. In order to secure piston 160 in its retracted position, instead of spring 180, other elements may be provided, which e.g. exert a frictional force to piston 160, at least when in the retracted position.

Moreover, according to the embodiment of cutting equipment 100 shown in FIGS. 2 to 5, second cylinder chamber 158 is in fluid connection with the atmosphere, whereby second cylinder chamber 158 is automatically vented. In the case that second cylinder chamber 158 is not in fluid connection with the atmosphere, an additional quick exhaust valve may be provided for venting second cylinder chamber 158, e.g. immediately before starting the next cutting operation.

What is claimed is:

1. A cutting equipment having a cutting device with a cutting element which is linearly reversibly movable in a cutting direction, and a drive device for reversibly moving the cutting element,
    wherein the drive device includes a pneumatically driven piston/cylinder arrangement;
    the piston/cylinder arrangement comprises a cylinder and a piston;
    the piston having a first effective piston surface and a second effective piston surface, wherein the cutting device is connected with the second effective piston surface and the first effective piston surface faces away from the cutting device, the piston being linearly reversibly movable in the cylinder between a retracted position and an extended position;
    the cylinder having a first end and a second end and being separated by the piston into a first cylinder chamber arranged between the first effective piston surface and the first end of the cylinder, and a second cylinder chamber arranged between the second effective piston surface and the second end of the cylinder; and
    a switch valve having a high-pressure input port, a high-pressure output port and a low-pressure output port, with the high-pressure input port coupled to a high-pressure source, the high-pressure output port coupled to the first cylinder chamber and the low-pressure output port coupled to the second cylinder chamber,
    wherein the switch valve connects the high-pressure input port to the high-pressure output port upon application of a pressurized fluid, and connects the high-pressure output port to the low-pressure output port upon reduction of the pressure level of the pressurized fluid.

2. The cutting equipment according to claim 1, wherein the drive device has a housing forming the cylinder.

3. The cutting equipment according to claim 1, wherein a closure cap is provided at the first end of the cylinder.

4. The cutting equipment according to claim 3, wherein a high-pressure connector port is arranged in the closure cap for connecting the first cylinder chamber to the high-pressure output port of the switch valve.

5. The cutting equipment according to claim 2, wherein a low-pressure connector port is arranged in the housing for connecting the second cylinder chamber to the low-pressure output port of the switch valve.

6. The cutting equipment according to claim 5, wherein a bore is provided in the housing extending from the first end of the cylinder towards its second end in cutting direction (CD), and which opens into the second cylinder chamber, with the low-pressure connector port being in fluid connection with the bore.

7. The cutting equipment according to claim 1, wherein an elastic element is provided in the second cylinder chamber, for moving the piston in a direction contrary to the cutting direction.

8. The cutting equipment according to claim 1, wherein a guide assembly is provided in the region of the second end of the cylinder, for guiding the cutting element during its reversal movement in the cutting direction.

9. The cutting equipment according to claim 8, wherein the guide assembly includes at least one support element, for supporting the cutting element during its reversal movement.

10. The cutting equipment according to claim 1, wherein the cutting element is directly connected with the second effective piston surface.

11. The cutting equipment according to claim 1, wherein the switch valve is an automatically working quick exhaust valve.

12. A clipping machine for producing sausage-shaped products, by filing a flowable filling material into a tubular or bag-shaped packaging casing and closing said packaging casing by a closure clip, the clipping machine comprising:
 a filling tube for feeding the filling material in a feeding direction into the tubular or bag-shaped packaging casing stored on the filling tube and being closed at its front end;
 gathering means for gathering the filled packaging casing and for forming a plait-like portion thereto, wherein the gathering means include a first displacer unit and a second displacer unit, and wherein the second displacer unit is reversibly movable in the feeding direction for forming a filling material free plait-like portion at the gathered portion of the filled packaging casing; and
 a clipping device having at least a first and a second closing tool being reversibly movable between an opened position and a closed position, for applying at least one closure clip to the plait-like portion and closing said closure clip when the closing tools are in their closed position,
 wherein the clipping machine further comprises a cutting equipment according to claim 1, for separating a sausage-shaped product just produced from the remaining supply of tubular packaging casing.

13. A method for controlling a cutting equipment according to claim 1,
 wherein the cutting arrangement includes a cutting device which is linearly reversibly movable in a cutting direction, and a drive device for reversibly moving the cutting device, with the drive device including a piston/cylinder arrangement, the method comprises the steps of:
 providing a pressurized fluid applied to a high-pressure input port of a switch valve being in a first operating state, via a high-pressure output port of the switch valve to a first chamber of the cylinder, thereby moving the piston from a retracted position into an extended position;
 after the piston has reached the extended position, reducing the pressure level of the pressurized fluid provided to the high-pressure input port of the switch valve; and
 guiding the pressurized fluid from the first chamber of the cylinder via the high-pressure output port of the switch valve being in a second operating state, and a low-pressure output port of the switch valve to a second chamber of the cylinder, thereby moving the piston from the extended position into the retracted position.

14. The method according to claim 13, including the steps of:
 providing the pressurized fluid to the high-pressure input port of the switch valve, and
 automatically transferring the switch valve into the first operating state.

15. The method according to claim 13, further including the steps of:
 reducing the pressure level of the pressurized fluid provided at the high-pressure input port of the switch valve, and
 automatically transferring the switch valve from the first operating state into the second operating state.

* * * * *